United States Patent [19]

O'Loughlin et al.

[11] Patent Number: 5,087,070
[45] Date of Patent: Feb. 11, 1992

[54] METHOD OF ASSEMBLING AN INFLATOR FOR A VEHICLE OCCUPANT RESTRAINT

[75] Inventors: John P. O'Loughlin; Conrad M. Novak, both of Mesa, Ariz.

[73] Assignee: TRW Inc., Lyndhurst, Ohio

[21] Appl. No.: 629,412

[22] Filed: Dec. 18, 1990

[51] Int. Cl.$^5$ .............................................. B60R 21/28
[52] U.S. Cl. .................................... 280/740; 280/736
[58] Field of Search ............... 280/743, 741, 740, 736, 280/728, 731, 792; 55/490, 502

[56] References Cited

U.S. PATENT DOCUMENTS

| | | | |
|---|---|---|---|
| 4,017,100 | 4/1977 | Gehrig et al. | 280/736 |
| 4,131,299 | 12/1978 | Ono et al. | 280/741 |
| 4,322,385 | 3/1982 | Goetz | 422/165 |
| 4,878,690 | 11/1989 | Cunningham | 280/741 |
| 4,902,036 | 2/1990 | Zander et al. | 280/736 |
| 4,960,448 | 10/1990 | Zievers | 55/502 |

Primary Examiner—Mitchell J. Hill
Assistant Examiner—Paul Dickson
Attorney, Agent, or Firm—Tarolli, Sundheim & Covell

[57] ABSTRACT

An inflator generates gas for inflating a vehicle occupant restraint. The inflator comprises a housing. The housing has a chamber for gas generating material and gas outlet openings through which gas flows from the housing into the restraint. A filter in the housing provides a gas flow path to the gas outlet openings. The filter filters and cools the gas as it flows in the gas flow path. The filter comprises a plurality of filter layers. At least one of the filter layers has a higher resistance to gas flow than at least one other of the filter layers. The filter layer of higher resistance to gas flow has a portion extending between and engaging the housing and the other filter layer to provide a gas flow sealing zone adjacent the housing. The gas flow sealing zone has a resistance to gas flow higher than the resistance to gas flow of the gas flow path.

14 Claims, 4 Drawing Sheets

METHOD OF ASSEMBLING AN INFLATOR FOR A VEHICLE OCCUPANT RESTRAINT

BACKGROUND OF THE INVENTION

1. Technical Field

The present invention relates to a gas generating device, and particularly to an inflator for inflating an air bag to protect an occupant of a vehicle.

2. Description of the Prior Art

Inflators to expand an air bag, when a vehicle encounters a sudden deceleration, such as in a collision, are well known. The air bag restrains movement of an occupant of the vehicle during the collision. The air bag is inflated by gas generated by activation of gas generating material. The gas generating material is contained in the air bag inflator.

The inflator for an air bag which protects the driver of a vehicle is usually mounted in the vehicle steering wheel. Such an inflator is preferably small and light weight to minimize the rotating mass of the steering wheel assembly. The inflator should also, for ease of manufacture and low cost, have a minimal number of parts which are simple to assemble.

A commonly used gas generating composition is one containing an alkali metal azide and a metal oxide, such as cupric oxide or iron oxide. Ignition of the gas generating composition produces a hot gas stream. The hot gas stream will typically include nitrogen gas, molten metal, sodium oxide, a sodium salt of the metal, and a metal nitride. The nitrogen gas carries the other reaction products, which are in the form of a residue or sinter.

A particular problem facing the air bag industry has been the development of an effective, low cost, mechanical filtering system for filtering residue and sinter from the hot gas stream. The filtering system must be capable of removing the residue or sinter from the gas before it enters the bag. The filtering system also should be capable of cooling the gas stream. A portion of the filtering system may have a reactant surface of an acidic oxide, such as silicon dioxide, to react with and neutralize the sodium oxide in the hot gas stream. To achieve these objectives, the filtering system must maintain a sealing zone where it contacts the inflator housing, so that the majority of the hot gas stream is directed through the filtering system.

U.S. Pat. No. 4,902,036 discloses a gas generator for a vehicle occupant restraint. The generator contains a plurality of filters including a final filter assembly which filters the nitrogen gas before the gas exits from the generator into an air bag. The final filter assembly comprises a first section of mesh screens. The mesh screens remove particulate reaction products from the gas stream. The final filter also has a second section of screens of smaller mesh size. The screen sections are separated by a spacer pad formed from a ceramic fiber that is a mixture of aluminum oxide and silicon dioxide. The spacer pad is sold under the trademark FIBERFAX by Sohio Carborundum, Inc. It is also known to have the foregoing final filter assembly seal against the generator housing by pressing graphite seals (not shown in the patent) between the housing and the upper and lower edges of the filter.

U.S. Pat. No. 4,878,690 also discloses a filter assembly used in a gas generator for a vehicle occupant restraint. The filter assembly comprises, in the direction of gas flow, a plurality of layers of 30 mesh stainless steel screen, a filter member for fine filtering the generated gas, and then another layer of 30 mesh stainless steel screen. The filter member can be an alumina-silica fiber paper such as LYTHERM ceramic fiber paper marketed by Mansville Co. Other examples of filter paper disclosed in the patent are silica fiber paper marketed by SANDTEX Corporation of Japan under the trademark "Sandtex" and a filter material sold by National Standard Co. of Corbin, Kentucky under the trademark "FIBREX". There is no disclosure in the patent as to how the filter assembly is sealed against the housing for the gas generator.

SUMMARY OF THE INVENTION

The present invention resides in a means for sealing a filter against a housing of an inflator for a vehicle occupant restraint. The inflator housing has a chamber for gas generating material and gas outlet openings through which gas flows from said housing into the restraint. A filter in said housing provides a gas flow path to said gas outlet openings. The filter filters and cools the gas as it flows in the gas flow path. The filter comprises a plurality of filter layers, at least one of the filter layers having a higher resistance to gas flow than at least one other of the filter layers. The one filter layer has a portion which extends between and engages the housing and at least one other of the filter layers to provide a gas sealing zone adjacent the housing. The gas sealing zone has a resistance to gas flow higher than the resistance to gas flow of the gas flow path.

Preferably, the filter layer having a higher resistance to gas flow is either a layer of a ceramic fibrous mat or a metal felt. Alternatively, the higher resistance layer can be a combination of a layer of ceramic fibrous mat and a layer of metal felt. The filter layer with the lower resistance to gas flow is preferably a metal mesh. The ceramic fibrous mat or metal felt preferably contains particles of an acidic oxide, which is reactable with the sodium oxide in the gas produced by ignition of the gas generating material. Further, in a preferred embodiment, the acidic oxide particles are sintered to the metal felt.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
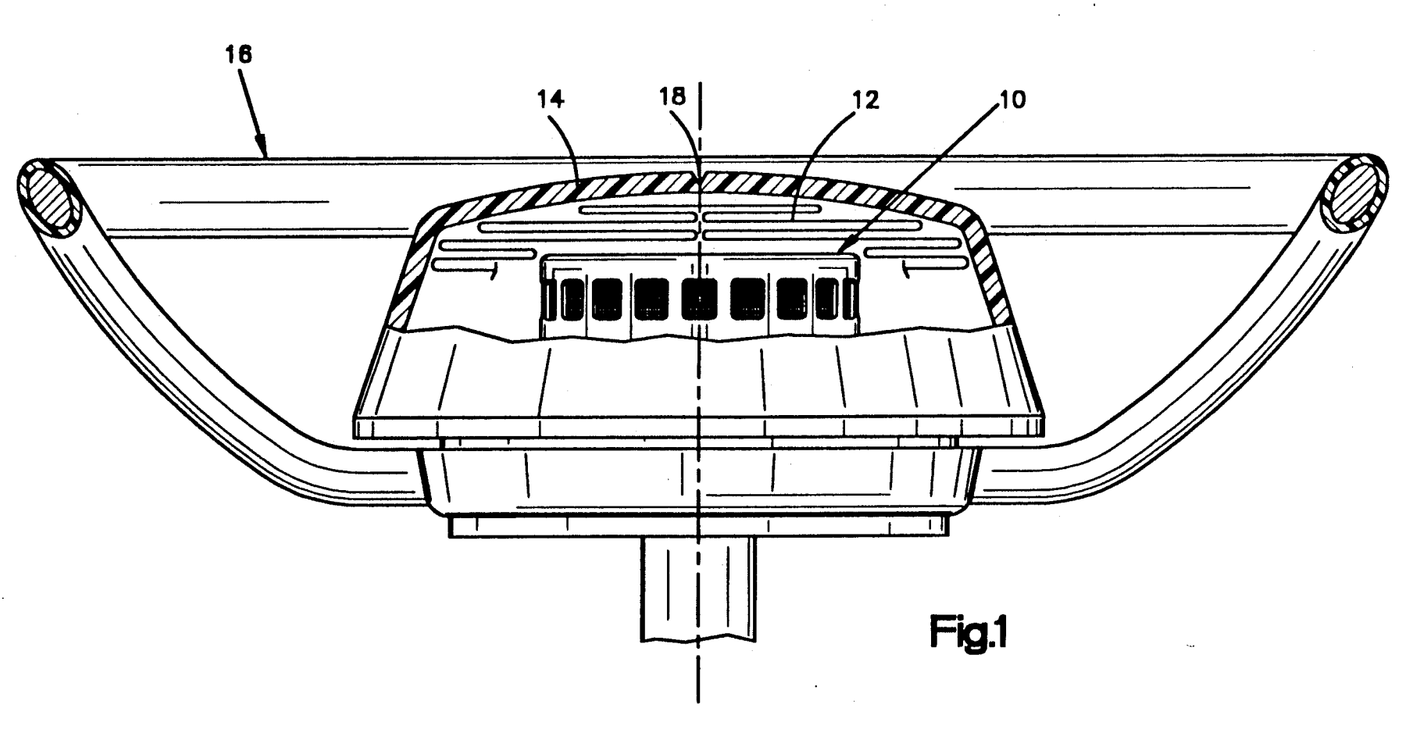
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 form a module which is mounted on a vehicle steering wheel 16.

Upon the occurrence of sudden vehicle deceleration, such as occurs in a collision, the inflator 10 is energized and produces a large volume of gas. The flow of gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely, a diffuser cup 42, a combustion cup 44, and a combustion chamber cover 46. The diffuser cup 42, the combustion cup 44, and the combustion chamber cover 46 are made of a metal, such as UNS S30100 stainless steel.

Figure 2:
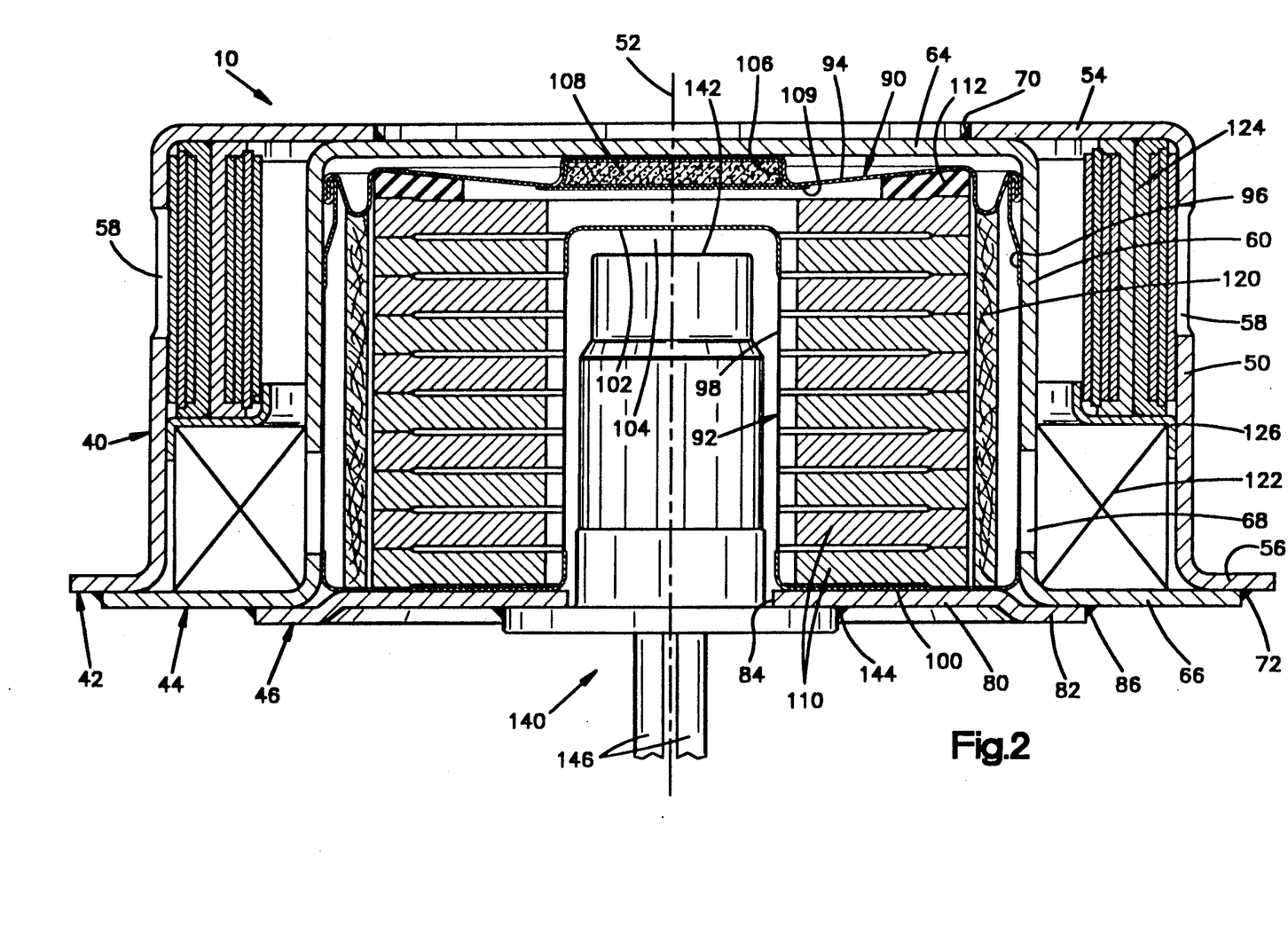
FIG. 2 is a transverse view, partially in section, of the inflator of FIG. 1.

The diffuser cup 42 is generally cup-shaped and has a cylindrical side wall 50 extending around the central axis 52 of the inflator 10. The side wall 50 extends between a flat upper end wall 54 and a flat lower flange 56. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion chamber side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098. A preferred gas generating material is one containing sodium azide. The sodium azide, on combustion, forms sodium oxide.

An annular prefilter 120 is disposed in the canister 90. The prefilter 120 is located radially outward of the gas generating disks 110 and inside the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials, to be described. The layers extend around the diffuser cup side wall 50 and are located inside the side wall. An annular filter shield 126 projects radially inwardly from the diffuser cup side wall 50 and separates the final filter assembly 124 and the slag screen 122. The filter shield 126 is secured to the diffuser cup side wall 50 by an interference fit, as will be described in more detail below.

The inflator 10 includes an initiator assembly 140. The initiator assembly 140 includes the igniter 142 which projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). Inside the igniter 142, the wire leads 146 are connected to a resistance wire embedded in an ignition material. A thin plastic film (not shown) is located on the outside of the upper portion of the igniter 142, to prevent metal-to-metal contact which could ground the igniter 142 and disable the inflator 10. The igniter 142 may be of any suitable well known construction.

Upon the occurrence of a collision or other sudden vehicle deceleration, the collision sensor closes an electrical circuit. An electrical current then flows through the wire leads 146 to the igniter 142. The resistance wire heats and ignites the igniter 142. Ignition of the igniter 142 forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of hot gas.

The gas pressure acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some coarse particulates and other combustion products of the initiator assembly 140 and of the gas generating disks 110. The prefilter 120 also cools the gas, and molten combustion products plate on the prefilter. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

Figure 3:
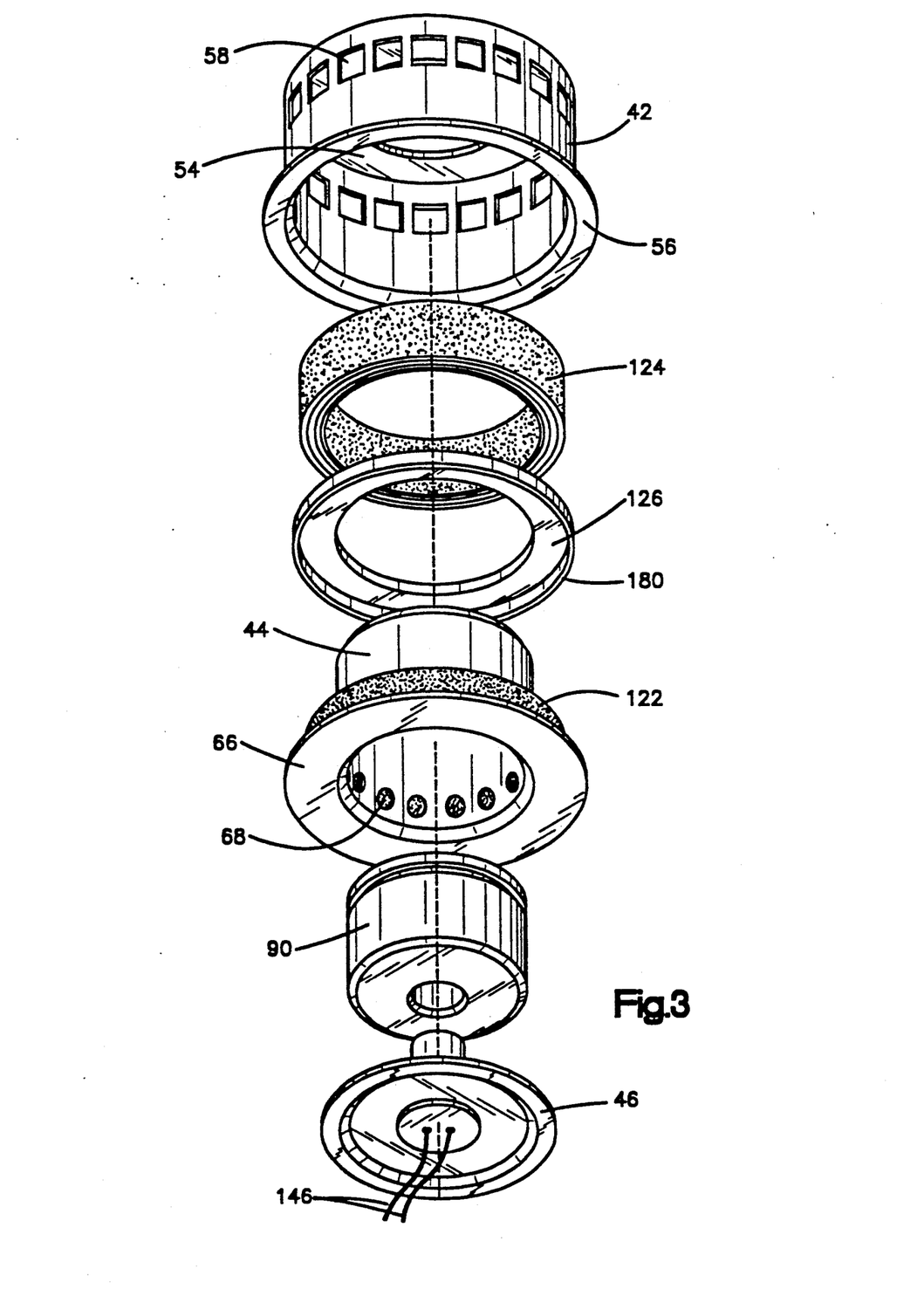
FIG. 3 is an exploded perspective view of a portion of the inflator of FIG. 2 showing a filter in accordance with the present invention.

Details of the filter assembly 124 are shown in FIGS. 2-5. As shown in FIG. 3, the filter assembly 124 comprises a plurality of layers of material wound in the form of a ring. The ring is formed by wrapping the layers on a cylindrical mandrel (not shown). The layers are first preassembled in a strip. The strip is then wound on the cylindrical mandrel. The outermost layer, which is a metal mesh, is wound so that it overlaps itself. The overlapping portions are then tack welded together to form a tight circular integral filter assembly 124. The filter assembly 124 can then be removed from the mandrel and does not unwrap.

Figure 4:
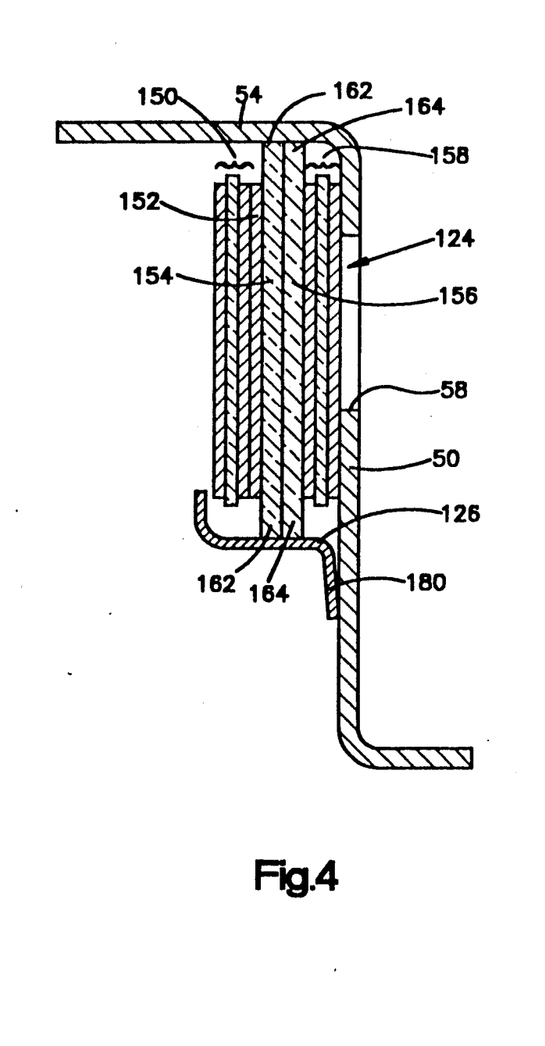
FIG. 4 is an enlarged sectional view of a portion of the inflator of FIG. 3 showing parts of the inflator prior to the completion of assembly of the inflator.

The filter assembly 124 as shown in FIG. 4 has nine layers. From the inside out, in the direction of gas flow, the first three layers 150 comprise a 28 mesh metal cloth, i.e., the mesh has 28 strands per inch in both the warp and weft directions. The fourth layer 152 is a 24×110 mesh metal cloth having 24 strands per inch in the weft direction and 110 strands per inch in the warp direction. The first three layers 150 function primarily as a heat sink. The fourth layer 152 has smaller openings than the first three layers. It functions primarily to entrap medium size particulates from the hot gas stream which are not removed in the prefilter 120 or slag screen 122. A suitable metal mesh for the three layers 150 and the layer 152 is stainless steel mesh. The layers 150 and the layer 152 could be made of other metals, for instance, carbon steel, nickel, copper, titanium, chromium and/or aluminum.

The fifth layer 154 of the filter assembly 124 is a ceramic fiber mat comprising a mixture of aluminum oxide and silicon dioxide marketed by Sohio Carborundum, Inc. under the trademark FIBERFAX. The composition of the mat is at least about 47% $Al_2O_3$ and at least about 47% $SiO_2$.

Instead of "Fiberfrax", the layer 154 can also be an alumina-silica ceramic mat marketed by Thermal Ceramics under the trademark ULTRAFELT. Other ceramic fibrous mats which can be used are an alumina-silica mat marketed under the trademarks CERABLANKET and CERACHEM by Thermal Ceramics. ULTRAFELT and CERABLANKET have compositions similar to FIBERFAX. CERACHEM contains about 36% $Al_2O_3$, 49% $SiO_2$ and 15% $Zr_2O_3$. The function of the silicon dioxide in the mat is to react with and neutralize the sodium oxide in the gas flow, in accordance with known practice. This reaction forms small particles of sodium silicates.

Typically, the layer 154 has a relatively high density, small pore size and greater thickness than the layers 150, 152. By way of example, the following are specifications for FIBERFAX:

| | | |
|---|---|---|
| Density | = | 9-11 lbs/ft$^3$ |
| Bulk Fiber Density | = | 2.6-2.8 grams/cm$^3$ |
| Thickness | = | about 0.125 inches |

The material provides a pressure drop of about 45-68 mm $H_2O$.

The sixth layer 156 is a nickel felt material. The nickel felt is marketed by National Standard Corp. under the trademark "FIBREX". It is a non-woven felt of nickel fibers which are densely packed to define a plurality of gas flow passages of small size. A purpose of the nickel felt layer 156 is to entrap the small particles of silicates which are formed in the gas stream. Typically, the felt layer 156 will have a base weight (without a coating) of about 0.5 to one gram/in$^2$, and a thickness of about 0.030 inches. Preferably, the nickel fibers are coated, for instance, by sintering, with particles of nickel or other inorganic material. This further constricts the size of the gas flow passage in the felt. The nickel felt can be coated on one or both sides. The ratio of the nickel felt to the coating particles can be in the range of about 80/20 to 60/40 by weight.

Whether coated or not, or coated on both sides or only one side, the nickel felt has a relatively low permeability to gas flow. For instance, a nickel felt having a base weight of about one gram/in$^2$, coated on both sides with a 60/40 ratio of nickel felt to nickel particles, has a permeability of about 5.13 ft.$^3$ of gas/min/ft.$^2$. A nickel felt having a base weight of about 0.5 grams/in$^2$, coated on one side, with an 80/20 ratio of nickel felt to nickel particles, has a permeability of about 220 ft.$^3$ of gas/min/ft.$^2$. The felt layer 156 can be constructed of metal fibers other than nickel capable of withstanding the temperatures and other conditions of the gas flow in the inflator. Examples of other suitable metals are stainless steel, carbon steel, copper, aluminum, titanium and chromium.

The sixth layer 156 can also comprise a nickel fiber felt, the fibers of which are coated with nickel particles and silicon dioxide particles. One example of such coating is a 60/40 ratio by weight of nickel fiber to the nickel and silicon dioxide particles. The nickel particles help contain the silicon dioxide and prevent the silicon dioxide from flaking off the metal fibers. The silicon dioxide provides further reactant sites for reacting with and neutralizing the sodium oxide in the gas flow.

The outer three layers 158 are similar in construction to the inner three layers 150 and are a 28 mesh metal cloth. The purpose of the outer three layers is primarily to provide reinforcement and strength to the filter assembly 124.

As shown in FIG. 4 before final assembly, the layers 150, 152, 154, 156 and 158 of the filter assembly 124 have different dimensions in the vertical direction transverse to the direction of gas flow. The vertical direction is that direction between the end wall 54 of the diffuser cup 42 and the filter shield 126. It is understood that these dimensions can vary depending upon such factors as the volume of the inflator 10 and the amount of gas flow. By way of example, the inner three layers 150 may have a vertical dimension in the range of about 17.8-18.6 millimeters. Ideally, the vertical dimension of all three layers 150 is the same. Tolerances in the manufacture of the metal mesh, however, may create some differences in the vertical dimensions, as shown. The fourth layer 152 will have a slightly smaller vertical dimension than the first three layers, e.g., about 17.6-18.5 millimeters.

The fifth and sixth layers 154 and 156, by contrast, have significantly greater vertical dimensions than the layers 150, 152. By way of example, these two layers may have a nominal vertical dimension in the range of about 22.5-23.5 millimeters. As shown in FIG. 4, the fifth and sixth layers 154, 156 have peripheral edge portions 162, 164 which extend about equal distances both above and below the upper and lower peripheral edges of the first four layers 150, 152.

Finally, the last three layers 158 have a nominal vertical dimension essentially the same as the vertical dimension for the first three layers 150, in the range of about 17.8-18.6 millimeters. As with layers 150, the upper and lower edges of intermediate layers 154, 156 are substantially equidistantly spaced above and below the upper and lower peripheral edges of layers 158.

The layers 150, 152 made of metal mesh, define, in the present invention, a first filter section. The overall thickness of the layers 150, 152 in the direction of gas flow is sufficient to provide a heat sink and entrap coarse particles. Obviously, the number of layers and their make-up can vary depending upon other aspects of the inflator. The first filter section being of metal mesh is one which has a relatively low resistance to gas flow.

The intermediate layers 154, 156 are made of materials of very small pore size and define a second filter section which has a relatively high resistance to gas flow. As with filter layers 150, 152, the make-up, thicknesses, and number of layers 154, 156 can vary. However, the function of layers 154, 156 is to provide reactive sites for neutralizing sodium oxide in the gas stream and to entrap small particles of silicates from the hot gas stream. Thus, the filter layers 154, 156 define a filter section having a higher resistance to gas flow than layers 150, 152.

The layers 158 make up a third filter section. The layers 158 are optional. The function of these layers is to add structural strength to the filter assembly 124. As such, they do not provide substantial additional resistance to gas flow. Thus, the layers 158 constitute a section of relatively low resistance to gas flow, compared to layers 154, 156.

Figure 5:
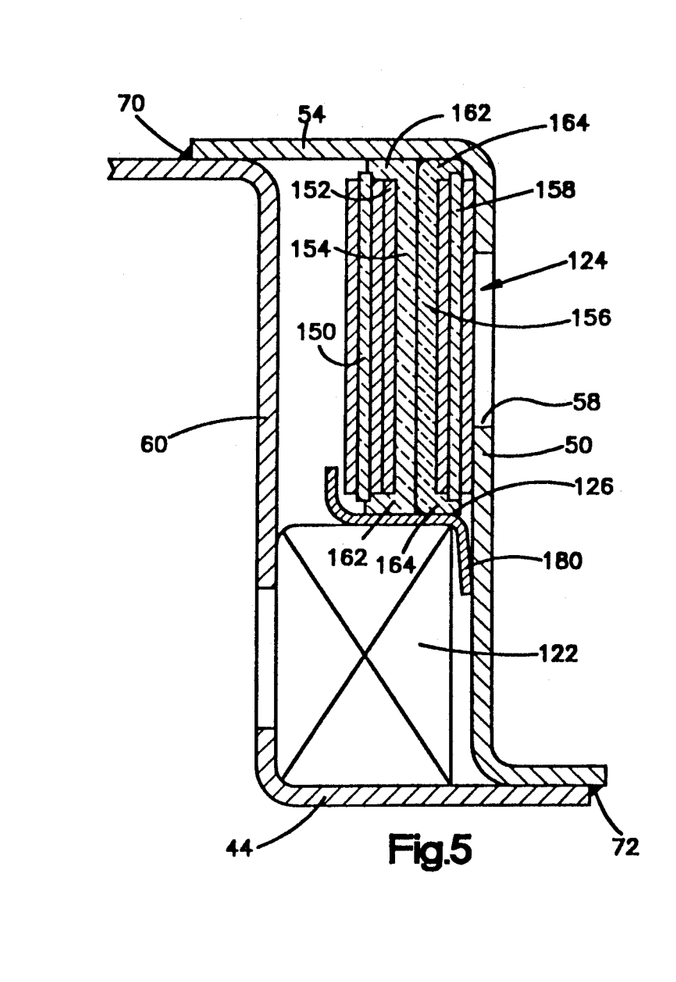
FIG. 5 is an enlarged sectional view of a portion of the inflator of FIG. 3 showing parts of the inflator after assembly of the inflator.

FIG. 5 shows the manner in which the filter assembly 124 of the present invention is sealed between the filter shield 126 and the diffuser cup end wall 54. The edge portions 162, 164 of the layers 154, 156, which extend beyond the upper and lower edges of the first filter section prior to final assembly, are folded over so as to abut against the exposed edges of layers 150, 152 and 158, respectively. These folded-over edge portions also lie against the upper surface of the filter shield 126 and the inner surface of the end wall 54 of the diffuser cup 52. As will be explained below, the filter shield has an interference fit with and seats against the diffuser cup side wall 50. The length of the folded over edge portions 162, 164 of layers 154, 156 in the direction of gas flow is sufficient to provide peripheral areas adjacent filter shield 126 and end wall 54 of relatively high resistance to gas flow. In other words, the length of the folded over edge portions 162, 164 exceeds the combined thickness of layers 154, 156 by such an amount that gas will flow preferentially through the central area of the filter assembly. The folded-over edge portions thus define a gas flow path through the filter assembly 124 and between the folded-over edge portions 162, 164 which has relatively low resistance to gas flow. The filter assembly 124 is thus sealed against the inflator housing and the gas flow will be through all of the layers of the filter assembly.

As shown in FIG. 5, the materials of the ceramic fiber and nickel felt layers 154, 156 are sufficiently compressible to accommodate variations in the vertical dimensions of layers 150, 152 and 158. In this way, the folded over layers also substantially prevent gas flow from bypassing any filter surface between the filter shield 126 and the end wall 54 of the diffuser cup 42, further effectively sealing the filter assembly 124 against the inflator housing.

Reference can be had to FIGS. 3, 4 and 5 for the method of assembly o the filter assembly 124 within the diffuser cup 42. Referring first to FIG. 3, the filter assembly 124 is placed in the diffuser cup 42 so that the filter assembly seats against end wall 54. The filter shield 126 is then positioned in the open end of the filter cup adjacent the flange 56. The filter shield 126 has a peripheral flange 180 which makes an interference fit with the side wall 50 of the diffuser cup. The filter shield 126 is pressed into the diffuser cup until it abuts against the filter assembly 124. This arrangement of the component parts is shown in FIG. 4.

The filter shield 126 is then pressed further into the diffuser cup 42. This forces the edge portions 162, 164 of the intermediate layers 154, 156 to fold over onto the edges of the layers 150, 152 and 158, as shown in FIG. 5. The interference fit between the flange 180 of the filter shield 126 and the side wall 50 of the diffuser cup 42 maintains the component parts in the configuration shown in FIG. 5. At this point, the other components are added to the assembly, ending in the welding of the diffuser cup 42 and combustion cup 44 together at weld locations 70 and 72 (FIG. 5).

Variations in the present invention will be apparent to those skilled in the art. For instance, by incorporating silicon dioxide into the nickel felt layer 156, it is possible to form the filter assembly without a ceramic fibrous mat such as layer 154. The numbers and mesh sizes for the filter screens 150, 152 and 156 can be varied. These and other variations can be made to control the gas output of the inflator as desired.

From the above description of the invention, those skilled in the art will perceive improvements, changes and modifications. Such improvements, changes and modifications within the skill of the art are intended to be covered by the appended claims.

We claim:

1. An inflator for generating gas to inflate a vehicle occupant restraint, said inflator comprising:
   a housing, said housing having a chamber for gas generating material and gas outlet openings through which gas flows from said housing into said restraint; and
   a filter in said housing providing a gas flow path to said gas outlet openings, said filter filtering and cooling the gas as it flows in the gas flow path,
   said filter comprising a plurality of filter layers, at least one of said filter layers having a higher resistance to gas flow than at least one other of the filter layers,
   said at least one of said filter layers having a portion engaging said housing and extending between said housing and said at least one other of the filter layers to provide a gas flow sealing zone adjacent said housing having a resistance to gas flow higher than the resistance to gas flow of said gas flow path.

2. The inflator of claim 1 wherein said one filter layer is a metal felt and said at least one other filter layer is a metal mesh.

3. The inflator of claim 1 wherein said one filter layer includes a metal felt layer and a contiguous ceramic mat layer, and wherein said metal felt layer and said ceramic mat layer have portions extending between said housing and said at least one other filter layer to provide said gas flow sealing zone.

4. The inflator of claim 3 wherein said metal felt is coated on at least one side with metal particles sintered to the felt.

5. The inflator of claim 1 comprising in the direction of gas flow a first plurality of layers of metal mesh, a layer of ceramic mat, a layer of metal felt, and a second plurality of layers of metal mesh, said layers of ceramic mat and metal felt having portions extending between the housing and said first and second plurality of layers of metal mesh to provide said gas flow sealing zone.

6. The inflator of claim 5 wherein said first plurality of layers of metal mesh comprises a plurality of layers of relatively coarse mesh providing a heat sink and a layer of relatively fine mesh to entrap particulates in the gas flow.

7. The inflator of claim 5 wherein said layer of ceramic mat comprises a portion extending between the housing and said first plurality of layers of metal mesh and said layer of metal felt has a portion extending between said housing and said second plurality of layers of metal mesh.

8. An inflator for generating gas to inflate a vehicle occupant restraint comprising:
   a housing having surfaces extending in a direction of gas flow;
   a filter assembly for filtering and cooling the gas flow, said filter assembly comprising:
      a first filter section including a metal mesh screen having a relatively large pore size and a thickness in the direction of the gas flow enabling the first filter section to function as a heat sink; and
      a second filter section contiguous with the first filter section and having a smaller pore size and a higher resistance to gas flow than the first filter section;
   said first filter section having opposite peripheral edges, said first and second filter sections defining a filter zone between said peripheral edges,
   said second filter section comprising opposite edge portions which extend beyond the opposite peripheral edges of the first filter section and are folded over onto the opposite peripheral edges of the first filter section,
   said folded over edge portions engaging said housing surfaces,
   the length of said folded over edge portions in the direction of gas flow being sufficient to provide a peripheral area of higher resistance to gas flow than said filter zone.

9. The inflator of claim 8 wherein said first filter section comprises a plurality of layers of a metal mesh screen and said second filter section comprises a layer of a ceramic fibrous mat, a layer of a metal felt, or the combination of a layer of a ceramic fibrous mat and a layer of a metal felt.

10. An inflator for generating gas to inflate a vehicle occupant restraint comprising:
    a housing having surfaces extending in a direction of gas flow;
    a filter assembly for filtering and cooling the gas flow, said filter assembly comprising:
       a first filter section comprising a plurality of layers of metal mesh screen having a relatively large pore size and a thickness in the direction of the gas flow enabling the first filter section to function as a heat sink;
       a second filter section contiguous with the first filter section and having a smaller pore size and a higher resistance to gas flow than the first filter section, said second filer section comprising a layer of ceramic fibrous mat, a layer of a metal felt, or the combination of a layer of a ceramic fibrous mat and a layer of a metal felt;
    said first filter section having opposite peripheral edges, said first and second filter sections defining a filter zone between said peripheral edges;
    said second filter section comprising opposite edge portions which extend beyond the opposite peripheral edges of the first filter section and are folded over onto the opposite peripheral edges of the first filter section;
    said folded over edge portions engaging said housing surfaces;

the length of said folded over edge portions in the direction of gas flow being sufficient to provide a peripheral area of higher resistance to gas flow than said filter zone; and wherein said gas contains sodium oxide and said second filter layer comprises a nickel felt layer, said nickel felt layer having sintered to it particles of an acidic oxide reactable with said sodium oxide.

11. The filter assembly of claim 10 wherein said nickel felt layer also has particles of nickel sintered to the nickel felt.

12. The filter assembly of claim 11 wherein said acidic oxide is silicon dioxide.

13. An inflator for generating gas to inflate a vehicle occupant restraint comprising:

a housing having surfaces extending in a direction of gas flow;

a filter assembly for filtering and cooling the gas flow, said filter assembly comprising:

a first filter section including a metal mesh screen having a relatively large pore size and a thickness in the direction of the gas flow enabling the first filter section to function as a heat sink;

a second filter section contiguous with the first filter section and having a smaller pore size and higher resistance to gas flow than the first filter section;

said first filter section having opposite peripheral edges, said first and second filter sections defining a filter zone between said peripheral edges, said second filter section comprising opposite edge portions which extend beyond the opposite peripheral edges of the first filter section and are folded over onto the opposite peripheral edges of the first filter section, said folded over edge portions engaging said housing surfaces, the length of said folded over edge portions in the direction of gas flow being sufficient to provide a peripheral area of higher resistance to gas flow than said filter zone; and wherein said second filter section comprises a layer of a ceramic fibrous mat formed from silicon dioxide and aluminum oxide and a layer of a metal felt comprising particles of nickel sintered to the metal felt.

14. A method of assembling a vehicle occupant restraint that comprises housing surfaces extending in a direction of gas flow and a filter assembly for filtering and cooling the gas flow, said filter assembly comprising a first filter section of relatively low resistance to gas flow and a second filter section of relatively high resistance to gas flow, said first filter section having peripheral edges, said first and second filter sections defining a filter zone within the confines of said peripheral edges, said method comprising the steps of:

providing the second filter section with edge portions which extend beyond the peripheral edges of the first filter section; and folding said peripheral edge portions over onto the peripheral edges of said first filter section, said peripheral edge portions engaging said peripheral edges and said housing surfaces;

the length of said peripheral edge portions being sufficient to provide peripheral areas of said filter assembly adjacent said housing surfaces with a resistance to gas flow which is higher than the resistance of said filter zone.

* * * * *